United States Patent Office 3,529,157
Patented Sept. 15, 1970

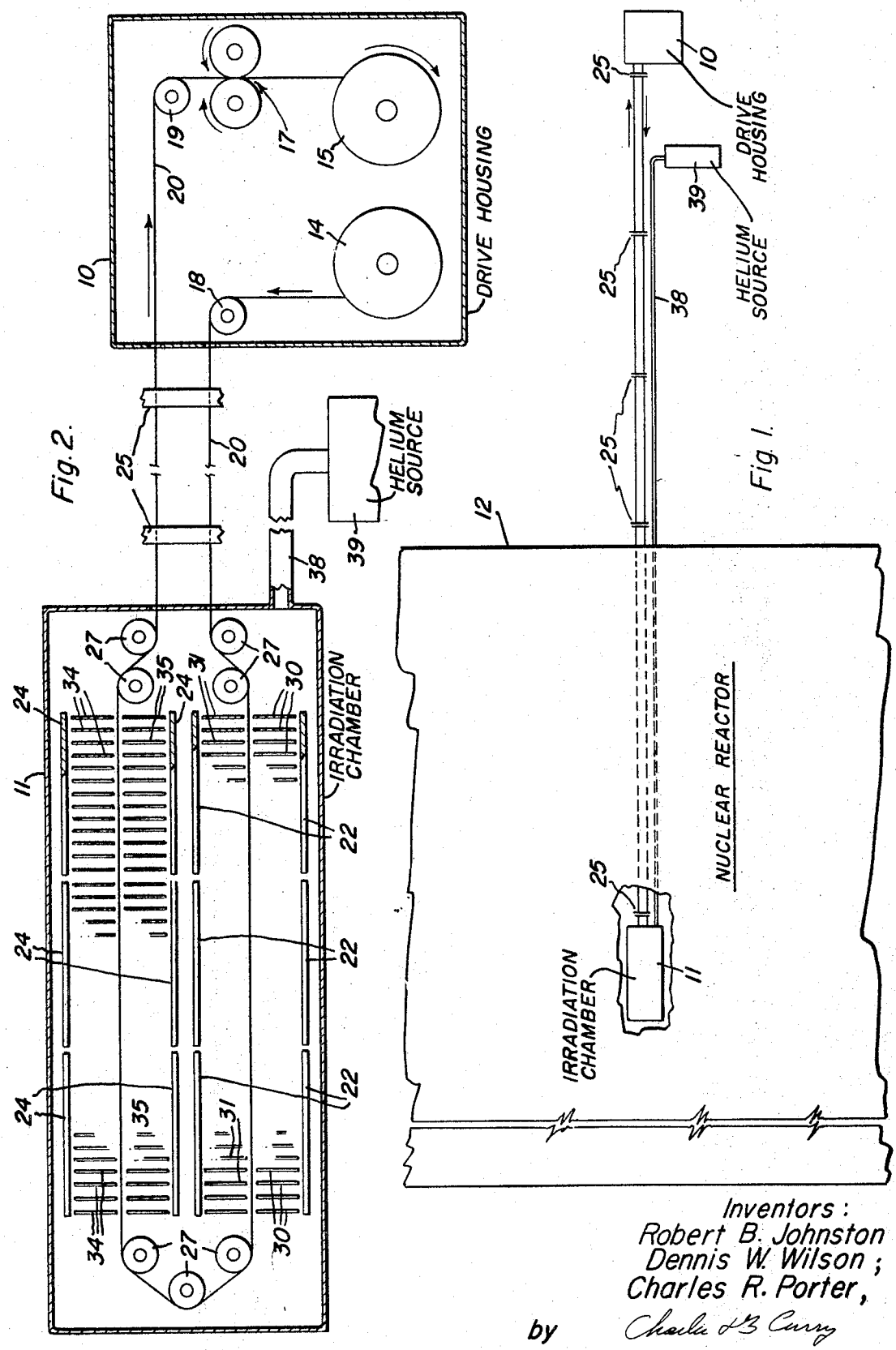

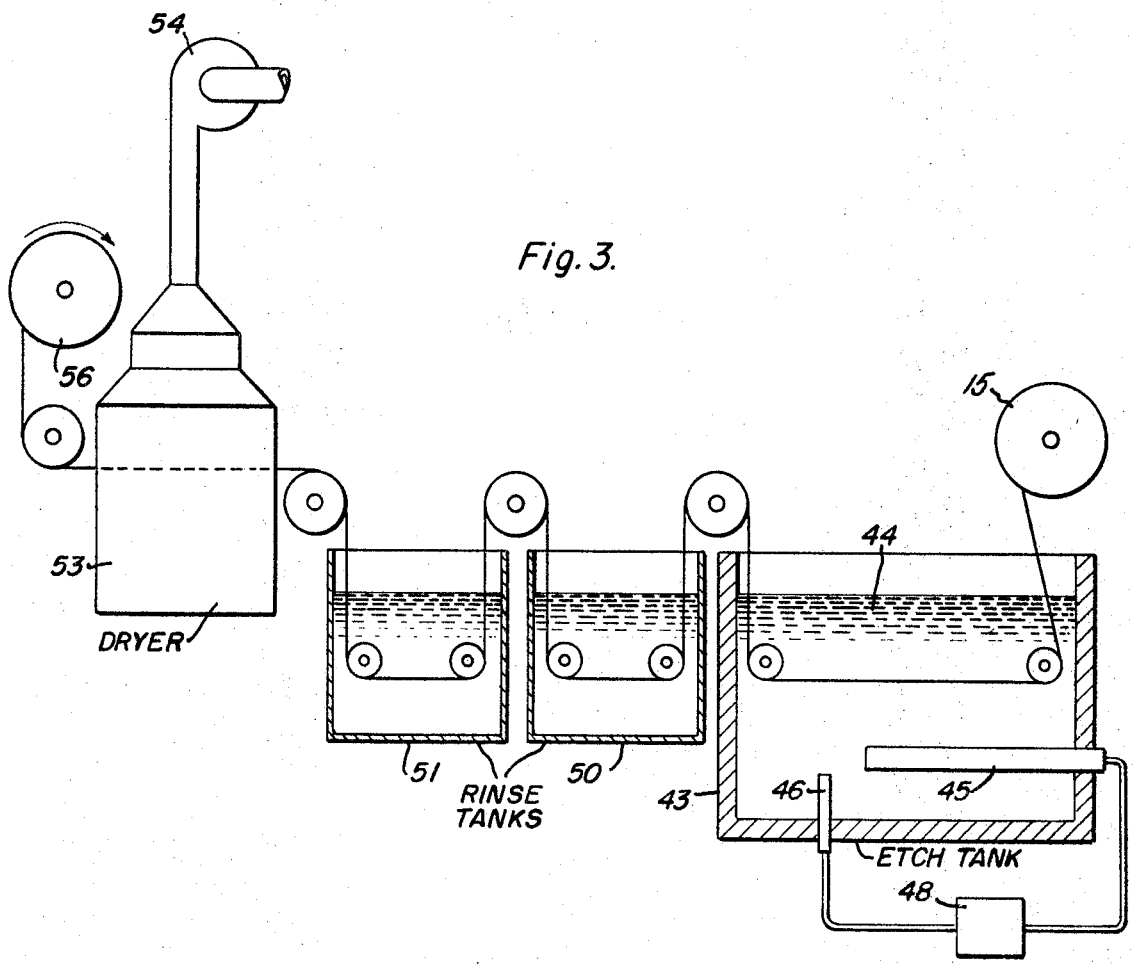

3,529,157
METHOD AND APPARATUS FOR FISSION-FRAGMENT IRRADIATION
Robert B. Johnston, Hayward, and Charles R. Porter and Dennis W. Wilson, Livermore, Calif., assignors to General Electric Company, a corporation of New York
Filed Aug. 11, 1966, Ser. No. 571,819
Int. Cl. G01t 5/00
U.S. Cl. 250—83  5 Claims

ABSTRACT OF THE DISCLOSURE

A method and apparatus for continuously irradiating a strip of dielectric material with fission fragments. In a typical embodiment, a tape of a dielectric material is passed adjacent a sheet of fissionable material which is bombarded with neutrons to cause the emission of fission fragments from the fissionable material. The fission fragments are collimated and impinge on the tape, forming damage tracks therethrough. The thus irradiated strip is suitable for treatment in an etchant which removes material along the damage tracks formed by the fission fragments. These strips are then ready for use as membrane filters.

---

The present invention relates generally to the charged particle radiation art and is more particularly concerned with the use of charged particles in a novel continuous method of conditioning or preparing dielectric material in strip, sheet or tape form for the selective removal of fission fragment damage track-defining material. This invention is also concerned with new apparatus implementing this novel method as the first of two stages in the mass production of filters and other articles disclosed and claimed in copending applications Ser. Nos. 176,320 now U.S. Pat. 3,303,085 and 368,520 filed, respectively, on Feb. 28, 1962 and May 19, 1964 in the names of Paul B. Price and Robert M. Walker and assigned to the assignee hereof.

In the production of the articles set forth in the above applications, the entire disclosures of which are incorporated herein by reference, it is important that an economic rate be achieved and that the precision of the manufacturing operations and the quality of the resulting products not be compromised in achieving such greater rate of production.

In accordance with the present invention, dielectric material in sheet, strip or tape form can be rapidly and uniformly treated in the first step of the irradiation-etching process disclosed in the above applications. Moreover, the method and apparatus of this invention have flexibility enabling the production of a variety of products. Thus, filters of greatly different effective opening sizes from five angstroms to 100,000 angstroms and even larger can be made rapidly and reproducibly in long lengths from a wide variety of materials having a common flexibility to the extent that they can be wound on reels and a dielectric characteristic which is conducive to the formation of selectively soluble fission fragment tracks.

In brief, the method of this invention comprises running flexible dielectric material in the form of tape, strip or sheet stock lengthwise along a travel course leading through an irradiation zone to a collection station outside the irradiation zone. Thus, traveling tape stock is bombarded over successive increments of its length with fission fragments as these successive increments traverse the irradiation zone. The method also includes controlling the density of fission fragment damage tracks in the successive increments of the stock either by regulating the rate of stock travel through the irradiation zone or by regulating the radiation flux in the irradiation zone. Additionally, the method may include the steps of selectively dissolving and removing the damage track-defining material from the tape and then rinsing and drying the resulting finished tape product.

In its apparatus aspect, broadly described, this invention comprises tape-irradiating means including a tape-irradiating chamber, a fission fragment source in the tape-irradiating chamber, a fission fragment collimator in that chamber, and tape travel course-defining means including guides leading the tape into and out of the irradiating chamber and through a path along the output side of the fission fragment collimator. This apparatus additionally includes tape transport means including a tape tension drive which engages the tape downstream from the irradiating chamber to draw the tape through and out of the chamber at a controlled tape-travel rate.

Those skilled in the art will gain a further and better understanding of the invention in both its method and apparatus aspects from the detailed description set out below taken in conjunction wth the drawings accompanying and forming a part of this specification, in which:

FIG. 1 is a diagrammatic view of the apparatus employed in carrying out the method of this invention in association with a nuclear reactor;

FIG. 2 is a diagrammatic view of the apparatus of FIG. 1 showing the tape-irradiating assembly and the tape drive means; and FIG. 3 is a diagrammatic view of apparatus employed in etching or selectively dissolving and removing irradiated portions of the tape.

As shown in FIG. 1, the present apparatus comprises generally a tape drive assembly in a drive housing 10 and a tape-irradiating assembly in irradiating chamber housing 11. Housing 11 is situated in the center of a nuclear reactor 12 where it is exposed to a high density thermal neutron flux. Drive housing 10, however, is situated outside the reactor and at some distance from housing 11.

The tape transport assembly, as illustrated in FIG. 2, comprises controlled drag tape feed reel 14 and an adjustable tension tape take-up reel 15, both of which are journaled in housing 10. The main tape drive is provided by powered capstan 17 situated just downstream from reel 15 and driven by electric motor means (not shown) mounted on the drive housing. Rotatable tape guides 18 and 19 in housing 10 are provided to guide tape 20 in travel from reel 14 out of housing 10 and back into the housing and to capstan 17.

The irradiating assembly in the chamber provided by housing 11 comprises a lower set of three pairs of oppoesd fission plates 22 and an upper set of three pairs of opposed fission plates 24. Each set of these plates defines between them a volume or space through which tape 20 may travel in running from feed reel 14 through the irradiating chamber and back to transport housing 10 and take-up reel 15. A plurality of stationary guides 25 between housings 10 and 11 maintain the tape in alignment in its travel from the transport mechanism into the nuclear reactor and back again. Seven tape guides 27 journalled for free rotation in housing 11 define a tape travel course through the irradiating chamber. Fission product collimators 30 and 31 comprising a large number of closely-spaced aluminum strips are disposed between fission plates 22 and between fission plates 24 so that tape 20 is exposed to both sets of fission plates only through these collimators.

Housing 11 is connected through conduit 38 to a source of helium under pressure indicated at 39. By this means, a positive pressure of helium is maintained in housing 11 throughout the period of operation of the apparatus and attenuation of fission fragments by the atmosphere is minimized.

In carrying out the method of this invention, fission fragments are continuously generated by neutron bombardment of fissionable materials and these fragments bombard tape 20 as it travels through the irradiating chamber. The speed of tape travel through the irradiating chamber is regulated and is preferably maintained constant. Alternatively, the neutron flux may be regulated or changed from time to time in the usual way in the operation of the reactor and the tape speed is appropriately altered so that the density of fission fragment damage tracks in the tape product is substantially uniform over the length of the tape. The size of the filter product openings and the proportion of filter openings, i.e., the filter capacity of the product, may thus be regulated and controlled because of this interrelation of neutron flux and tape travel rate.

In actual operation, a three-inch diameter aluminum tube was employed as irradiating chamber housing 11, enclosing the fission plate-collimator assembly. Fission plates 22 and 24 were 1⅛-inch by 10-inch aluminum plates coated with $^{235}UO_3$ to a density of about 0.5 mg./cm.$^2$ (about five percent of average fission fragment range). Collimators 30, 31, 34 and 35 each comprised a plurality of closely-spaced, parallel aluminum strips providing an entrance angle of fission fragments in tape 20 in the 10° to 50° range. Housing 11 was situated in the center of a nuclear test reactor while tape drive housing 10 was located outside the reactor about eight feet away. The tape was driven at a constant speed of 200 feet per minute by an electric motor geared to capstan 17. A 1000-foot length of one-half mil crystalline polycarbonate tape was used as the processing stock.

Following the irradiation operation, the irradiated tape collected on take-up reel 15 was run lengthwise through an etching bath of 6 N caustic soda solution at 80° C., as illustrated in FIG. 3. The fission fragment tracks were thereby selectively dissolved and removed from the tape, leaving round openings of substantially uniform diameter approximating 1.0 micron in the tape product. This product also had throughout its length substantially uniform porosity and each increment of length of the tape had substantially the same filter capacity as the other corresponding segments of the tape product. Hole size in this product can be regulated by adjustment of the etching solution temperature or by varying the length of the etching period.

As shown in FIG. 3, irradiated tape enters etch tank 43 containing the 6 N caustic soda solution 44 maintained at temperature by means including an immersion heater 45, a thermoswitch 46 and a heater controller 48. The tape is then withdrawn from bath 44 and run through water rinse tanks 50 and 51 and into a dryer box 53 where clean dry air is blown against the etched, rinsed tape by blower 54. The dry apertured tape is then wound on a collection reel 56 as the finished product.

Having thus described this invention in such full, clear, concise and exact terms as to enable any person skilled in the art to which it apertains to make and use the same, and having set forth the best mode contemplated of carrying out this invention, we state that the subject matter which we regard as being our invention is particularly pointed out and distinctly claimed in what is claimed, it being understood that equivalents or modifications of, or substitutions for, part of the specifically described embodiments of the invention may be made without departing from the scope of the invention as set forth in what is claimed.

What we claim as new and desire to secure by Letters Patent of the United States is:

1. Apparatus for the continuous production of selectively etchable radiation damage tracks in a tape of dielectric material which comprises:
   (a) a tape irradiating chamber;
   (b) tape travel course defining means including tape guides for guiding tape for travel into said chamber, along an irradiation path within said chamber, and out of said chamber;
   (c) a fission fragment source spaced adjacent said irradiation path within said chamber;
   (d) a fission fragment collimator including a plurality of closely spaced parallel thin metal strips, the surfaces of said strips being substantially perpendicular to said tape path and to said fission fragment source; said collimator positioned between said fission fragment source and said irradiation path and adapted to collimate fission fragments emitted by said fission fragment source toward said path; and
   (e) tape transport means including drive means to engage tape downstream from said chamber and draw said tape through said irradiation path and out of said chamber at a controlled tape travel rate.

2. Apparatus as described in claim 1 including additionally means comprising a helium gas source connected to the tape-irradiating chamber for maintaining a helium gas atmosphere in the said chamber.

3. The apparatus of claim 1 wherein said fission fragment source comprises a fissionable isotope and further including a nuclear reactor at least partially surrounding said chamber whereby said fissionable isotope is irradiated with neutrons to cause the emission of fission fragments therefrom.

4. A method for the continuous production of selectively etchable radiation damage tracks in a tape of dielectric material which comprises:
   (a) irradiating a fissionable material with neutrons to fission said material whereby fission fragments are emitted thereby;
   (b) collimating at least a portion of said fission fragments by directing said fission fragments between a plurality of closely spaced parallel thin metal strips, the surfaces of which are substantially perpendicular to the surface of said fissionable material;
   (c) moving a tape of dielectric material continuously through a zone subjected to irradiation by the collimated fission fragments to form damage tracks therein;
   (d) controlling the density of fission fragment damage tracks in successive tape increments by regulating the rate of tape travel through said zone; and
   (e) directing said tape to a collection station outside said zone.

5. The method of claim 4 including further: contacting the irradiated tape with an etching solution which selectively dissolves and removes the damage track defined material; rinsing the etched tape with water; and drying said tape.

References Cited

UNITED STATES PATENTS

| | | | |
|---|---|---|---|
| 2,751,505 | 6/1956 | Anderson | 250—83.1 |
| 3,303,085 | 2/1967 | Price et al. | |

OTHER REFERENCES

R. L. Fleischer et al., Science 140, 1221 (1963).
B. Price et al., J. Appl. Phys. 33, 3407 (1962).

ARCHIE R. BORCHELT, Primary Examiner

U.S. Cl. X.R.

176—19; 250—83.1